United States Patent Office 3,717,124
Patented Feb. 20, 1973

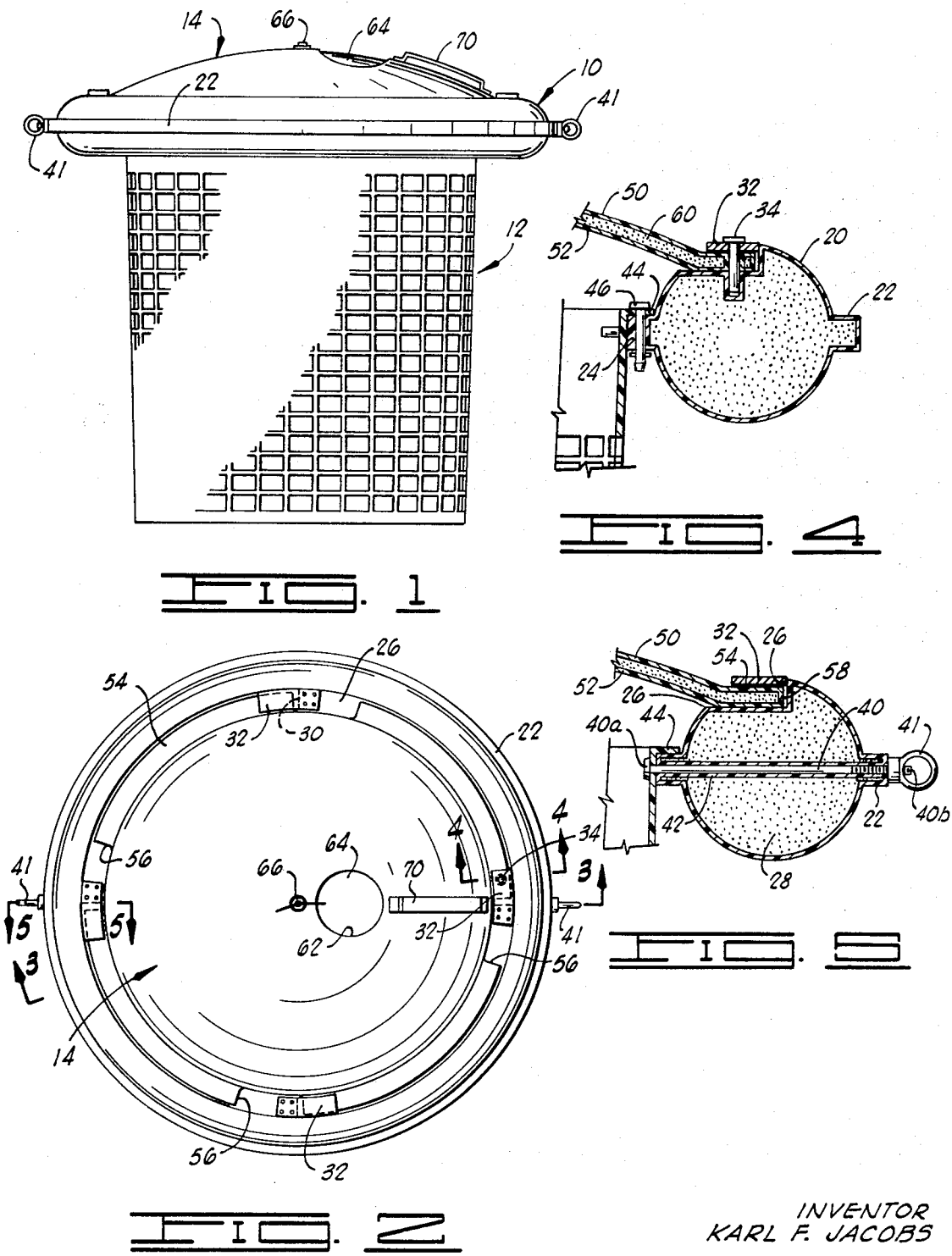

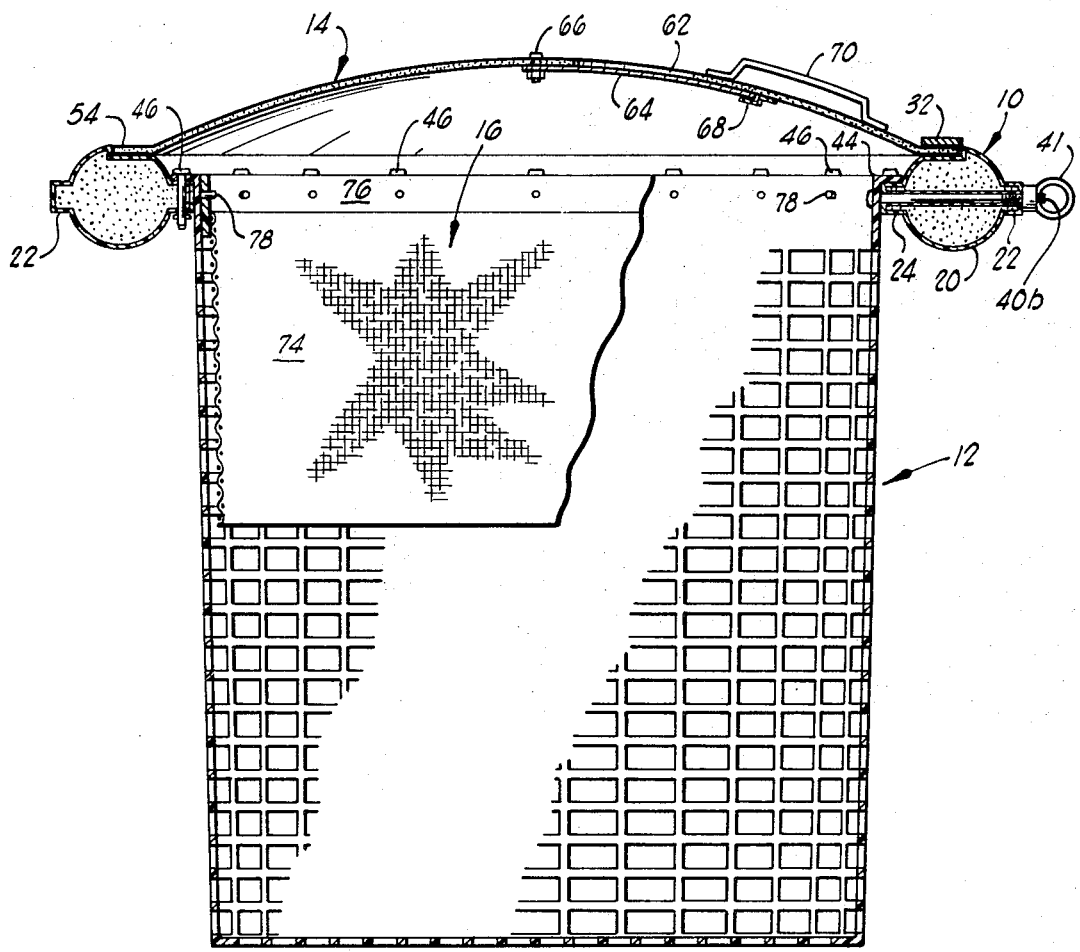
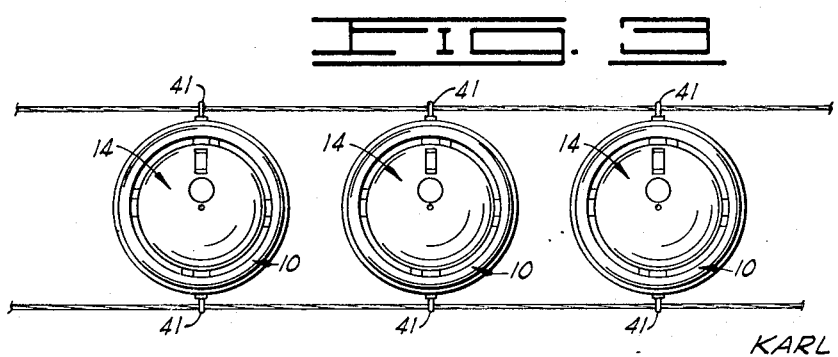

3,717,124
FISH CULTURE CAGE ASSEMBLY
Karl F. Jacobs, 28 Circle Drive,
Chickasha, Okla. 73018
Filed Feb. 18, 1971, Ser. No. 116,458
Int. Cl. A01k 61/02, 97/04
U.S. Cl. 119—3                                   21 Claims

ABSTRACT OF THE DISCLOSURE

A fish culture cage assembly which includes an annular float ring having a radially inwardly extending flange thereon. The assembly also includes a foraminous, generally cylindrical cage structure, having an open upper end and a closed lower end, detachably depending from said flange, and a lid detachably secured to said float ring and covering the open top of said cage structure. A cylindrical feeding ring may be detachably suspended from projections inside the foraminous cage in the upper portion thereof. The feed ring has a plurality of openings which are substantially smaller than the openings through the cage, the feed ring being open at its upper and lower ends.

BACKGROUND OF THE INVENTION

Field of the invention

This invention relates to aquatic containers adapted for the spawning and rearing of aquatic fauna and flora, and more particularly, but not by way of limitation, to fish cages particularly adapted for the rearing of fingerling fish.

Brief description of the prior art

Fish culture cages have been used for growing fish in a natural aquatic environment for many years. The cages in which the fish are located are conventionally made of some type of foraminous material, such as metal or cloth netting or screening, and such cages are suspended upon some type of flotation structure and project downwardly in the water. In some instances, the flotation structure is made of a foamed plastic material of square or rectangular configuration, and the cage is attached to either the outer perimeter or the inner perimeter of the flotation structure. Fish which are being raised in the fish culture cage are fed by means of a feeding ring which is an enclosing wall of fine mesh material which is positioned inside the cage, and which serves to retain against loss through the larger perforations in the cage, a floating feed or nutrient material which is placed in the feeding ring daily. The feeding ring is quickly detachable from the cage or from the float structure from which the cage is suspended.

In many of the fish culture cages heretofore in use, the flotation structure which is provided for suspending the cage in the water has been constructed of a material, such as foamed plastic, which is unprotected against mechanical impact, and which is susceptible to chemical attack by floating oils and hydrocarbons, and to consumption by muskrats, beavers, and the like. Styrofoam, a widely used flotation material, is markedly susceptible to several of these deleterious influences.

Another limitation which has characterized previous fish culture cages is the method of harvesting which can be employed in removing fish from the cages. In some instances, the geometry of the cage limits the harvesting technique to removal of the fish by dipping a removal device into the cage, and entrapping the fish therein. So-called mechanical harvest by the use of a lift bucket cannot be employed.

Some difficulty has been experienced with fish culture cages of prior construction in adequately anchoring these structures, or in interengaging a plurality of the structures. Eyes or pins screwed or embedded in the foamed plastic flotation material often pull loose after relatively short periods of use.

BRIEF DESCRIPTION OF THE PRESENT INVENTION

The present invention provides a versatile, mechanically rugged and easily used fish culture cage assembly which offers a number of advantages over such cages as they have been heretofore constructed. Broadly described, the fish culture cage assembly of the invention comprises a float ring having a foraminous cage suspended therefrom and a lid detachably secured to the float ring and closing the open upper end of the cage. A perforate feed ring may be suspended from the float ring within the upper end of the foraminous cage. The float ring is preferably of annular or circular configuration and is of an armored construction, having a strong, hard outer shell constructed of mechanically strong, chemically inert material. The hollow interior of the outer shell is preferably constructed of a foamed plastic material.

The lid is also of an armored construction similar to the described construction of the float ring, and is preferably of a concavo-convex configuration for enhanced mechanical strength.

The cage and feed ring are both preferably cylindrical in shape, and are quickly and easily detachable from the float ring.

An object of the invention is to provide a fish culture cage assembly which is durable and of long service life because:

(a) It is not deleteriously affected by exposure to strong sunlight, wide variations in temperature or attack by most organic chemicals which contaminate or are present in natural or artificial bodies of water.

(b) It has a geometry which concurrently enhances mechanical strength and offers a profile less resistant to wave action and current.

(c) It is of an armored construction which protects the primary flotation material against abrasion, chipping, fracturing and being eaten by aquatic animal life.

Another object of the invention is to provide a fish culture cage assembly which is adaptable to the mechanical harvesting of the fish therein by lift buckets and similar devices.

A further object of the invention is to provide a fish culture cage assembly which is adaptable to the automatic feeding of fish therein.

Another object of the invention is to provide a fish culture cage which can be easily used either individually or with a number of other cages by suspending the cages in series on a single cable or in parallel between a pair of cables.

An additional object is to provide a fish culture cage assembly which is volumetrically designed to enhance the ease with which amounts of food and/or medicament to be fed can be calculated.

Another object of the invention is to provide a fish culture cage having a geometric configuration such that the cage accommodates the customary swimming mannerisms of groups of fish better than the types of culture cages previously utilized for raising fish.

Additional objects and advantages of the invention will become apparent as the following detailed description of the invention is read in conjunction with the accompanying drawings which illustrate the invention.

BRIEF DESCRIPTION OF THE DRAWINGS

FIG. 1 is a side elevation view of the fish culture cage constructed in accordance with the present invention.

FIG. 2 is a plan view of the fish culture cage depicted in FIG. 1.

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 2.

FIG. 6 is a diagrammatic illustration of one way of interconnecting and anchoring a plurality of the culture cage assemblies of the invention.

DETAILED DESCRIPTION OF PREFERRED EMBODIMENTS OF THE INVENTION

Referring initially to FIG. 1 of the drawings, shown therein is a fish culture cage constructed in accordance with the present invention. The fish culture cage assembly may be considered as including four major subassemblies. These are (a) a float ring 10 which has suspended therefrom, (b) a cage 12, and which has detachably secured thereon for closing the upper end of the cage, (c) a lid 14. In some conditions of use, the fourth subassembly, (d) a feed ring 16, is detachably secured within the upper portion of the cage 12 and is partially depicted in FIG. 3 of the drawings.

Referring in greater detail to the several subassemblies, and considering first the float ring 10, the float ring includes an outer shell or exoskeleton 20 which is made of a relatively rigid material, such as metal or a rigid thermoplastic. Preferably, the outer skin 20 is constructed of either a relatively high density thermoplastic or fiberglass, with such material being relatively light in weight, impervious to water, resistant to attack by organic solvents, and having a relatively high mechanical strength. The outer skin 20 should also be tolerant to wide variations in temperature since the structure will be subjected to seasonal changes entailing such variations.

The outer skin 20 of the float ring 10 is of annular overall configuration with a generally circular cross-sectional configuration. There are provided, however, at opposite sides of the float ring (that is, the radially inner and radially outer sides in diametrically opposed relation) a pair of radially extending flanges. The radially outwardly projecting flange is designated by reference numeral 22 and the radially inwardly projecting flange is designated by reference numeral 24. Both the radially projecting flanges 22 and 24 are hollow with the hollow interior thereof communicating with the hollow interior of the float ring. The exoskeleton or outer skin 20 of the float ring may suitably be molded in two halves and joined together along seam lines which bisect the outer and inner flanges 22 and 24, respectively.

Adjacent the upper side of the float ring 10, the outer skin 20 has a relief molded therein to provide a flange-receiving groove or lid recess 26 extending completely around the float ring. The lid recess 26 functions for receiving a flange of the lid 14 as hereinafter described in greater detail.

The outer skin 20 of the float ring 10 is filled with a foamed plastic material 28 which adds to the overall strength and rigidity of the float ring, and imparts the primary buoyancy thereto. Though air sealed within the float ring 10 would, of course, provide buoyancy, the inclusion of the foamed plastic 28 within the float ring assures the retention of sufficient buoyancy to support the fish culture cage assembly even in the eventuality of the outer skin becoming ruptured or undesirably perforated. A suitable material for inclusion within the outer skin 20 is styrofoam.

The outer shell 20 functions to provide protection to the foamed plastic material against the mechanical shocks of intense wave action, from mechanical impacts of collision by passing boats, floating logs, etc., from attack by organic solvents which may be floating upon the surface of the body of water where the fish culture cage is located (such as oil slicks), and from being eaten by muskrats and other aquatic animals. The entire float ring structure 10 is strengthened further by its annular configuration, and by the provision of the outer and inner flanges 22 and 24. The radially outwardly extending flange 22 further provides a bumper element or fender to protect the float ring from damage due to collisions with floating objects or with docks, piers, or the like.

Mounted at circumferentially spaced intervals around the float ring 10 in the flange receiving groove 26 are a plurality of mounting brackets 30. In the illustrated embodiment of the invention, four of the mounting brackets are illustrated and constitute simply small rectangular pedestals secured by screws, rivets or other suitable means to the upper side of the float ring 10 in the lid recess 26. To each of the mounting brackets 30 is then secured in any suitable way, a lid locking flange 32 which projects in cantilevered fashion over the lid recess 26 from the respective mounting bracket 30. One of the lid locking flanges 32 is provided with a recess to accommodate a locking pin 34 used to lock the lid 14 in position in the manner hereinafter described in greater detail.

Extending diametrically through the float ring 10 at two sides thereof are a pair of anchor bolts 40. Each of the anchor bolts 40 has a head 40a and a threaded end portion 40b which threadedly engages an anchor eye 41 located at the outside of the float ring, and abutting the radially outwardly extending flange 22. The head 40a of each anchor bolt 40 bears against the upper portion of the cage 12 when the cage is positioned as shown in the drawings. Each anchor bolt 40 passes through a tube 42 which extends diametrically through the float ring 10 and through the inner and outer flanges 22 and 24 located at opposite sides thereof.

The anchor eyes 41 provide an attachment point whereby the fish culture cage assembly may be anchored to single anchor lines or may be attached in series between two cables or lines in any desirable manner. It should be pointed out that in lieu of a pair of the anchor bolts 40 being provided on opposite sides of a float ring 10 in the manner depicted in the drawings, a single elongated anchor bolt may be extended diametrically through the float ring to provide greater structural strength and to enhance the ease with which a plurality of the culture cages may be connected together in series, either by interconnection of the eyes with each other, or by serial connection on a single chain or cable.

The foraminous cage 12 which is detachably suspended from the float ring 10 is provided with relatively large perforations or openings therein to facilitate free circulation of water through the cage. The cage 12 is preferably constructed of a synthetic resin material, but for some applications or conditions may suitably be constructed of metal or plastic coated metal. The synthetic resin which is the preferred material of construction may be relatively easily formed or fabricated in the basket shape depicted, is relatively light in weight, and can be made, by appropriate selection of the resin, highly resistant to chemical attack by common organic solvents which might be present as a slick on a body of water in which the culture cage assembly is located. At its upper end, the cage 12 is provided with a radially outwardly extending flange 44 which projects over and rests upon the radially inwardly projecting flange 24 of the float ring 10. The flange 44 is provided with a plurality of circumferentially spaced holes which are aligned with holes provided in the radially inwardly extending flange 24 of the float ring 10 so that the cage 12 may be secured in position by means of a plurality of securement pins 46 extended through the aligned holes in the manner depicted in FIG. 4.

The lid 14 utilized in the fish culture cage assembly of the invention is a concavo-convex structure having a convexly shaped upper surface skin 50 and a concavely shaped lower surface skin 52. Around the outer periphery of the lid 14, a flange 54 is provided and is relieved or interrupted at circumferentially spaced intervals therearound by a plurality of recesses 56. The recesses 56 are sufficiently large to pass the mounting brackets 30 and locking flanges 32 when the lid is rotated on the float ring 10 to a releasing or unlocking position as hereinafter described. At the outer edge of the lid 14, the upper skin 50 and lower skin 52 are joined in an annular side edge 58. The lid 14 is thus a hollow structure and accommodates within its interior, a foamed plastic material 60.

Formed through the lid 14 is a feeding port 62. The feeding port 62 is closed by a sliding plate 64 which mates with the under side of the lid and is pivotally retained thereagainst by a pivot pin 66 and a guide bracket 68. The plate 64 may be pivoted to one side about the pivot pin 66 to uncover the feed port 62. A handle 70 is secured to the upper side of the lid 14 and functions to permit the lid to be rotated between locked and unlocked positions. In the position depicted in FIG. 2 of the drawings, the lid is locked by engagement of the flange 54 with the locking flanges 32.

A final subassembly forming a portion of the fish culture cage assembly of the invention is the feed ring 16 (see FIG. 3). The feed ring 16 includes a fine mesh, foraminous skirt portion 74 which is made of a flexible, preferably synthetic resin material. The skirt portion 74 is shaped as an open ended cylinder (that is, open at the top and at the bottom) of a diameter such that it can be suspended within the upper portion on the cage 12. At its upper edge, the skirt portion 74 is secured to a flexible securement ring portion 76. The securement ring 76 is of slightly lesser diameter than the upper portion of the cage 12 so as to mate with the cage at this location. The feed ring 16 is provided at circumferentially spaced intervals around the securement ring portion thereof with a plurality of holes. These holes receive radially inwardly projecting studs or protuberances 78 which extend inwardly from the upper portion of the cage 12. In this way, the feed ring 16 may be quickly attached inside the cage 12, and hangs downwardly from the multiple points of connection to the cage in the manner depicted in FIG. 3.

The skirt portion 74 of the feed ring 16, as shown in FIG. 3, projects downwardly within the cage 12 to approximately half of the depth of the cage, and is open at the bottom thereof. It should be pointed out that in some applications of the fish culture cage assembly of the invention, a modified feed ring which is of the same size as the cage 12 may be snapped in place for the purpose of reducing the size of the openings through the cage 12, and of permitting relatively small fry or fingerlings to be safely retained within the cage and the described modified feed ring liner therefor.

OPERATION AND USE

In utilizing the fish culture cage assembly of the invention, the fingerlings or fry to be grown are first placed in the cage 12, preferably while the cage is submerged in the water. This is accomplished by removal of the lid 14. The lid can be removed by gripping the handle 70 and rotating the lid in a counterclockwise direction from the locked status in which it is shown in FIG. 2 of the drawings. This will bring the recesses or slots 56 to a position on the float ring 10 such that the mounting brackets 30 and locking flanges 32 will pass through these slots, and the lid can be lifted off of the float ring. The open upper end of the cage 12 is thus accessible, and the fingerlings can be deposited in the cage without difficulty.

When the fingerlings to be raised have been deposited in the cage 12 and the lid 14 replaced, the fish culture cage assembly may be semipermanently anchored in a desired location in a suitable body of water. This may be accomplished by a single cable anchor line attached to one of the anchor eyes 41 or, more frequently, a plurality of the fish culture cage assemblies will be connected on one or more of the cables by extending the cables through the anchor eyes of the several assemblies. One arrangement which can be conveniently used for this purpose is that which is depicted in FIG. 6 of the drawings. Here a plurality of the fish culture cage assemblies are shown connected in parallel on a pair of cables or flexible lines 80 which are extended across a body of water.

Of course, after the fry or fingerlings to be raised have been placed in the cage 12 of the assembly, the lid 14 is returned to its locked status which is depicted in FIG. 2 of the drawings. The locking pin 34 is preferably extended through the cooperating apertures disposed in the flange 54 and one of the lid locking flanges 32 to retain the lid 14 in its locked position. With the lid 14 locked in position, and the culture cage assembly suspended in the water, a secure natural environment for the growth of the fish is provided. The cage is adaptable to aeration or water circulation systems which may be provided for moving water or air through the cage on a semicontinuous or continuous basis. The construction of the cage assembly permits it to withstand severe wave action, and the ultraviolet ray content of intense sunlight does not attack or cause deterioration of materials of construction in the float ring 10 and lid 14 when they are exposed to the sunlight.

The volume of free space contained within the cage 12 is preferably 0.001 acre-foot, and in this respect, the present invention entails a departure from prior types of construction which provided for the inclusion of one cubic yard or one cubic meter within the rectangular cages most frequently provided. The direct correlation of the volume of the cage to the acre-foot unit simplifies the use of various medication formulae employed in the process of raising fish, since the specified medication dosage is generally based upon acre-foot units.

Another important characteristic of the fish culture cage assembly of the invention is the cylindrical configuration of the cage 12. Although, for various unrelated reasons, minnow buckets and similar bait holding devices have, in the past, been made in a cylindrical configuration, the large fish culture cages manufactured for the purpose of raising fish have, within my acquaintance, usually been square or rectangular in configuration. In providing a cylindrical cage of the type utilized in the present invention, the advantage is attained that there is less wastage of space, and the fish being raised in the culture cage assembly do not suffer physical harm or damage as a result of bumping into the corners of the cage. Recent piscatorial research has indicated that when a number of fry or fingerlings are confined in a restricted environment of the type constituted by the interior of the cage 12, they tend to form a round ball or group together in a spherical configuration and continually move in a circular motion. Thus, there is less physically damaging abrasion of the fish against the side wall of a cylindrical cage, and there is less wasted space in the cage.

For the purpose of feeding the fish with a floating or very slowly sinking food material, the lid 14 is removed in the manner hereinbefore described, and the feed ring 74 is quickly snapped into position as illustrated in FIG. 3. (In some instances, it may be desirable simply to permit the feed ring to remain in place at all times.) The lid 14 is then returned to its locked-in-place position, and feeding can be effected on a periodic basis through the feed port 62 formed through the lid 14. The feeding can be carried out by simply moving the sliding plate 64 to one side and inserting the feed through this port. If desired, the plate 64 may be spring loaded so that it will automatically return to its closed position after feeding.

As the feed contacts the surface of the water beneath the lid 14 and within the float ring 10, it floats on the water at this location or gravitates very slowly downwardly in the water within the feed ring 74. The feed ring 74 prevents the food thus distributed from being dissipated and lost through the relatively large pores or perforations in the cage 12. At the same time, the feed is easily accessible to the fish from below as the fish swim upwardly through the open lower end of the feed ring 74. The vertical dimension of the feed ring 74 may be varied to suit the particular circumstances, and the type of fish being fed. It will be perceived that the use of the quickly insertable feed ring 74 in the manner described increases the economy of feeding, and prevents interference with proper aeration and water flow through and within the cage 12.

After the fish have attained the maximum growth which is expected within the fish culture cage assembly, the assembly lends itself to mechanical harvesting of the fish by means of mechanical lift buckets. These buckets are essentially supporting devices which are suspended from a crane and which are used for bodily lifting the fish culture cage assembly to an elevated position on shore. From this position, the contents of the fish culture cage assembly may be dumped into a storage facility, transport truck or the like. The cylindrical configuration and flat bottom of the cage 12, conjunctively with the completely unobstructed open upper end of this cage when the lid 14 is removed, facilitate mechanical harvesting of this type, since the culture cage assembly can be tilted by tilting of the harvest bucket upon which it is resting to permit the contents of the cage 12 to flow freely and easily into a waiting receptacle.

Although a preferred embodiment of the invention has been herein illustrated and described in order to set forth the basic principles of the invention in a manner sufficient to permit those skilled in the art to practice the invention. it will be perceived that various changes and innovations in the described structure can be effected without departure from these basic principles. All such changes and innovations are therefore deemed to be circumscribed by the spirit and scope of the invention except as the same may be limited by the appended claims or reasonable equivalents thereof.

What is claimed is:

1. A fish culture cage assembly comprising:
   a float ring;
   a foraminous cage detachably connected to said float ring for downward suspension therefrom when said float ring is afloat, said cage having an open upper end and a closed lower end;
   a lid detachably connected to said float ring and closing the open upper end of said cage; and
   a cylindrical feed ring detachably mounted within said cage for extension downwardly from said float ring within said cage, said feed ring having a plurality of openings therethrough which are substantially smaller than the openings through said cage and said feed ring being open at its upper and lower ends.

2. A fish culture cage as defined in claim 1 wherein said float ring is annular in configuration and wherein said cage is generally cylindrical and attached at one open end to said float ring whereby said cage is complementary in shape to a spherically bunched plurality of fish swimming in said cage.

3. A fish culture cage as defined in claim 1 wherein said float ring comprises:
   a relatively rigid outer skin of generally circular cross-sectional configuration forming an armored, hollow exoskeleton;
   a buoyancy-imparting material filling the interior of said outer skin; and
   a pair of flanges positioned in the plane of said float ring and projecting from opposite sides of said rigid outer skin.

4. A fish culture cage assembly as defined in claim 1 wherein said lid comprises:
   a relatively rigid upper skin of concavo-convex configuration;
   a relatively rigid lower skin of concavo-convex configuration and complementary in configuration to said upper skin; and
   a buoyancy-imparting material filling the interior of said outer skin, said lid having an outer peripheral edge portion detachably connected to said float ring.

5. A fish culture cage assembly as defined in claim 1 wherein said float ring is further characterized in having a flange projecting horizontally therefrom toward the interior of the float ring;
   and wherein said cage has an open end and a closed end and a flange projecting from said open end into overlapping relation to the flange projecting from said float ring for supporting said cage from said float ring.

6. A fish culture cage assembly as defined in claim 1 and further characterized as including a plurality of aligned anchor bolts extending through said float ring; and
   an anchor eye on one end of each of said anchor bolts which is outside said float ring.

7. A fish culture cage assembly as defined in claim 3 wherein said float ring is circular and that portion of said ring from which said flanges project is round in cross-section;
   and wherein said cage is generally cylindrical in configuration and is mounted coaxially within said float ring.

8. A fish culture cage assembly as defined in claim 3 and further characterized to include
   a pair of anchor bolts positioned on opposite sides of said float ring and each extending through said flanges; and
   an anchor eye threadedly secured to one end of each of said anchor bolts outside said float ring and bearing against one of said flanges.

9. A fish culture cage as defined in claim 3 wherein said outer skin is a high density synthetic resin material non-reactive with hydrocarbons and not palatable to aquatic animals; and
   wherein said buoyancy-imparting material is a foamed synthetic resin.

10. A fish culture cage assembly as defined in claim 4 wherein said lid is further characterized in having
    a feed port extending therethrough; and
    a sliding plate closing said feed port.

11. A fish culture cage assembly as defined in claim 4 wherein said float ring is ciricular and carries an annular flange-receiving recess around one side thereof; and
    wherein said lid is further characterized in having an annular flange adjacent the outer peripheral edge thereof and positioned in said flange-receiving recess.

12. A fish culture cage as defined in claim 7 and further characterized to include
    a pair of anchor bolts positioned on opposite sides of said float ring in alignment with each other and each extending through said float ring to pass through the pair of flanges carried thereby; and
    an anchor eye threadedly secured to one end of each of said anchor bolts on the outside of said float ring and bearing against one of said flanges to adapt said culture cage assembly to engagement with an anchoring cable.

13. A fish culture cage assembly as defined in claim 12 wherein said outer skin of said float ring is a high density synthetic resin material which is chemically inert with respect to organic solvents; and
    wherein said buoyancy-imparting material is a foamed synthetic resin.

14. A fish culture cage assembly as defined in claim 13 wherein said lid comprises:
 a relatively rigid upper skin of concavo-convex configuration;
 a relatively rigid lower skin of concavo-convex configuration and complementary in configuration to said upper skin; and
 a buoyancy-imparting material positioned between said upper and lower skins, said lid having an outer peripheral edge portion detachably connected to said float ring.

15. A fish culture cage assembly as defined in claim 14 wherein said lid is further characterized in having a feed port extending therethrough; and
 a movable plate closing said feed port.

16. A fish culture cage assembly comprising:
 an annular float ring of generally circular cross-sectional configuration and including a foamed synthetic resin buoyancy material inside a rigid annular outer shell, said ring further having a pair of radially projecting strengthening flanges disposed on opposite sides of the ring in diametrically aligned relation and in the plane of the ring;
 anchor bolt means extending through the float ring including the aligned strengthening flanges thereof;
 an elongated foraminous cage of circular cross-section having an open end and a closed end;
 means detachably securing the open end of said cage to the float ring flange which projects radially inwardly in the annular float ring; and
 a concavo-convex lid having a circular outer peripheral edge and detachably secured to said annular outer shell to close the open end of said cage.

17. A fish culture cage as defined in claim 16 wherein said lid is further characterized in having an annular flange around the outer periphery thereof, said flange having circumferentially spaced slots therein; and
 wherein said culture cage assembly further comprises engaging means on said float ring engageable with the flange on said lid when said lid is turned to one position on said float ring, and alternately aligned with said slots when said lid is turned to a second position on said float ring.

18. A fish culture cage assembly as defined in claim 17 wherein said lid is further characterized in having a relatively rigid protective skin at the outer surfaces thereof, and a flotation material in the interior thereof.

19. A fish culture cage assembly comprising:
 a float ring;
 a foraminous cage of cylindrical configuration having a plurality of openings therein and detachably connected to said float ring for downward suspension therefrom when said float ring is afloat, said cage having an open upper end and a closed lower end;
 a plurality of studs projecting inwardly from the upper end of said foraminous cage;
 a lid detachably connected to said float ring and closing the open end of said cage; and
 an open ended cylindrical feed ring of lesser diameter and length than said foraminous cage mounted within said foraminous cage for extension downwardly from said float ring within said cage, said feed ring having a plurality of openings therethrough which are substantially smaller than the openings through said cage and further having:
 a perforate skirt portion containing the openings through said feed ring; and
 an upper securing ring portion having a plurality of circumferentially spaced apertures therein receiving said studs for detachably securing said feed ring in said foraminous cage.

20. A fish culture cage assembly comprising:
 a float ring;
 a foraminous cage detachably connected to said float ring for downward suspension therefrom when said float ring is afloat, said cage having an open upper end and a closed lower end;
 a lid connected to said float ring and closing the open end of said foraminous cage; and
 a cylindrical, open ended feed ring of lesser diameter and length than said foraminous cage, and having a plurality of openings therethrough which are substantially smaller than the openings through said cage, said feed ring having a perforate skirt portion having the openings in said feed ring extending therethrough, and further having an upper securing ring portion for securement of said feed ring to said foraminous cage; and
 means on the upper end of said foraminous cage for detachably securing said feed ring in said cage.

21. A fish culture cage assembly comprising:
 an annular float ring of generally circular cross-sectional configuration and including a foamed synthetic resin buoyancy material inside a rigid annular outer shell, said ring further having a pair of radially projecting strengthening flanges disposed on opposite sides of the ring in diametrically aligned relation and in the plane of the ring;
 anchor bolt means extending through the float ring including the aligned strengthening flanges thereof;
 an elongated, foraminous cage of circular cross-section having an open end and a closed end;
 means detachably securing the open end of said cage to the float ring flange, said flange projecting radially inwardly in the annular float ring, said means comprising a plurality of projections mounted on said flange; and
 a lid having a circular outer peripheral edge and detachably secured to said annular outer shell of said float ring to close the open end of said cage.

References Cited

UNITED STATES PATENTS

| | | | |
|---|---|---|---|
| 2,734,305 | 2/1956 | Hannah | 43—56 |
| 3,478,463 | 11/1969 | Ruter | 43—55 |
| 3,381,408 | 5/1968 | Nishimura | 43—55 |
| 756,097 | 3/1904 | Burroughs | 43—55 |
| 1,883,135 | 10/1932 | Walker et al. | 43—56 |
| 3,025,629 | 3/1962 | Sears | 43—55 |
| 2,739,410 | 3/1956 | Budnick | 43—55 |
| 3,573,934 | 4/1971 | Mitchell | 119—3 X |

LOUIS G. MANCENE, Primary Examiner

J. H. CZERWONKY, Assistant Examiner

U.S. Cl. X.R.

43—55, 56